(12) United States Patent
Zeng et al.

(10) Patent No.: US 11,281,974 B2
(45) Date of Patent: Mar. 22, 2022

(54) ACTIVATION ZERO-BYPASS AND WEIGHT PRUNING IN NEURAL NETWORKS FOR VEHICLE PERCEPTION SYSTEMS

(71) Applicant: GM GLOBAL TECHNOLOGY OPERATIONS LLC, Detroit, MI (US)

(72) Inventors: Shuqing Zeng, Sterling Heights, MI (US); Wei Tong, Troy, MI (US); Shige Wang, Northville, MI (US); Roman L. Millett, Clinton Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 608 days.

(21) Appl. No.: 16/170,698

(22) Filed: Oct. 25, 2018

(65) Prior Publication Data

US 2020/0134459 A1    Apr. 30, 2020

(51) Int. Cl.
| | |
|---|---|
| *B60R 1/00* | (2006.01) |
| *G05D 1/00* | (2006.01) |
| *G05D 1/02* | (2020.01) |
| *G06N 3/04* | (2006.01) |
| *G06N 3/08* | (2006.01) |

(52) U.S. Cl.
CPC .............. *G06N 3/082* (2013.01); *B60R 1/00* (2013.01); *G05D 1/0088* (2013.01); *G05D 1/0246* (2013.01); *B60R 2300/8046* (2013.01)

(58) Field of Classification Search
CPC .... G06N 3/082; G06N 3/0454; G05D 1/0088; G05D 1/0246; B60R 1/00; B60R 2300/8046
See application file for complete search history.

(56) References Cited

U.S. PATENT DOCUMENTS

| | | | |
|---|---|---|---|
| 10,225,607 B1* | 3/2019 | Bai | G06N 3/04 |
| 2018/0164866 A1* | 6/2018 | Turakhia | G06N 3/063 |
| 2018/0225116 A1* | 8/2018 | Henry | G06F 9/30076 |
| 2018/0232640 A1* | 8/2018 | Ji | G06N 3/0454 |
| 2018/0299900 A1* | 10/2018 | Bae | G06K 9/00805 |
| 2019/0205737 A1* | 7/2019 | Bleiweiss | G06N 20/00 |

\* cited by examiner

*Primary Examiner* — Frederick M Brushaber
(74) *Attorney, Agent, or Firm* — Cantor Colburn LLP

(57) ABSTRACT

In one example implementation according to aspects of the present disclosure, a computer-implemented method includes capturing a plurality of images at a camera associated with a vehicle and storing image data associated with the plurality of images to a memory. The method further includes dispatching vehicle perception tasks to a plurality of processing elements of an accelerator in communication with the memory. The method further includes performing, by at least one of the plurality of processing elements, the vehicle perception tasks for the vehicle perception using a neural network, wherein performing the vehicle perception tasks comprises performing an activation bypass for values below a first threshold, and performing weight pruning of synapses and neurons of the neural network based at least in part on a second threshold. The method further includes controlling the vehicle based at least in part on a result of performing the vehicle perception tasks.

20 Claims, 8 Drawing Sheets

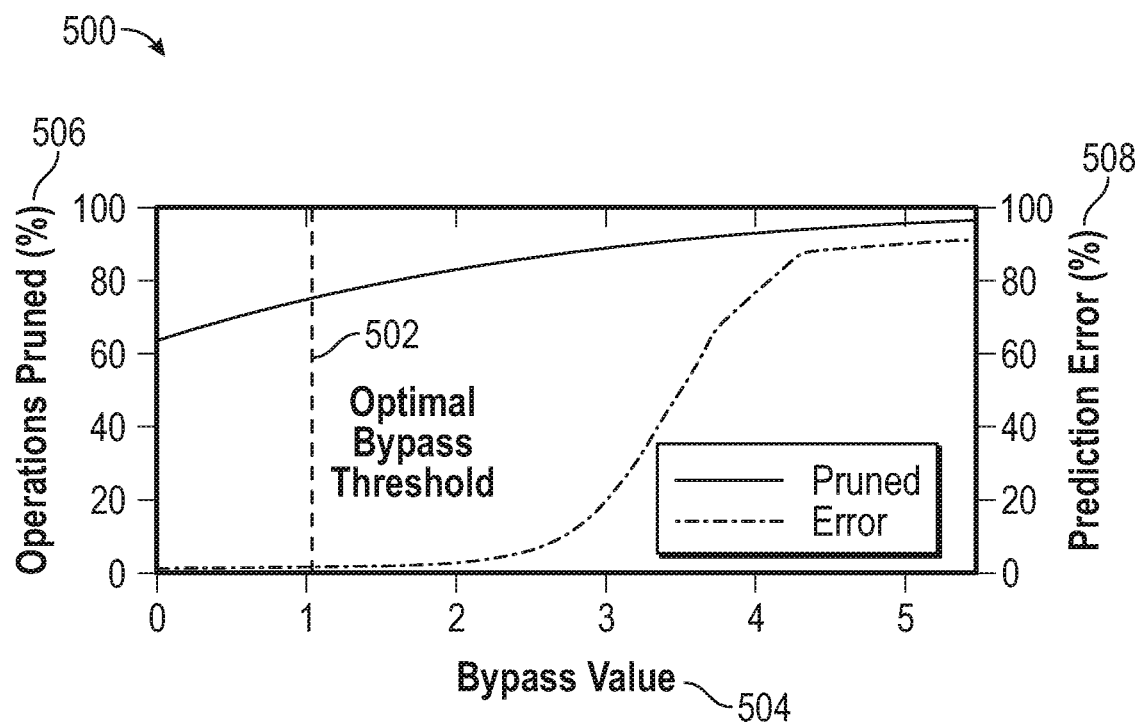
FIG. 5
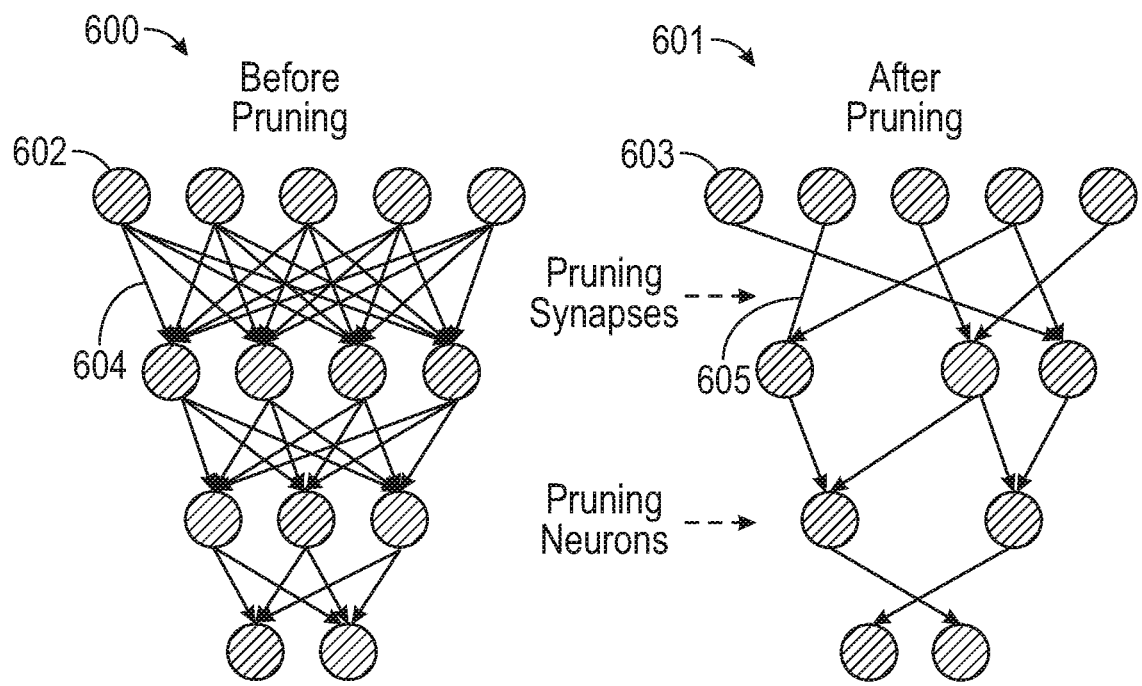
FIG. 6A
FIG. 6B

ACTIVATION ZERO-BYPASS AND WEIGHT PRUNING IN NEURAL NETWORKS FOR VEHICLE PERCEPTION SYSTEMS

INTRODUCTION

The subject disclosure relates to controlling a vehicle and, more particularly, to activation zero-bypass and weight pruning in neural networks for vehicle perception systems.

Machine learning involves the generation and use of algorithms capable of learning from, and making predictions, on data. Such algorithms typically operate by building a model from example inputs in order to make data-driven predictions or decisions. A number of machine learning approaches have been developed. One such approach, known as an artificial neural network (ANN), or simply a neural network (NN), is a learning algorithm inspired by the structure and function of biological neural networks.

An NN includes hierarchal layers of interconnected groups of artificial neurons (nodes), where each layer of nodes receives as inputs, the outputs of a lower layer. Deep neural networks (DNNs) are a type of NN that includes one or more hidden layers of nodes. Feed-forward NNs are NNs in which connections between the nodes do not form a cycle. That is, feed-forward NNs are NNs in which the information moves in only one direction, forward, from the input nodes, through the nodes of one or more hidden layers (if any), and ultimately to the output nodes. Convolutional NNs constitute a class of deep, feed-forward NNs that include input and output layers as well as multiple hidden layers. The hidden layers typically include convolutional layers, pooling layers, fully-connected layers, and normalization layers. Technical improvements to conventional NNs are described herein.

SUMMARY

In one exemplary embodiment, a computer-implemented method includes capturing a plurality of images at a camera associated with a vehicle and storing image data associated with the plurality of images to a memory. The method further includes dispatching vehicle perception tasks to a plurality of processing elements of an accelerator in communication with the memory. The method further includes performing, by at least one of the plurality of processing elements, the vehicle perception tasks for the vehicle perception using a neural network, wherein performing the vehicle perception tasks comprises performing an activation bypass for values below a first threshold, and performing weight pruning of synapses and neurons of the neural network based at least in part on a second threshold. The method further includes controlling the vehicle based at least in part on a result of performing the vehicle perception tasks.

In one or more embodiments, performing the weight pruning further comprises, performing an analysis, performing weight pruning based on the analysis, and tuning the weight pruning. In one or more embodiments, performing the weight pruning further comprises determining whether to perform additional compression. In one or more embodiments, performing the weight pruning further comprises, responsive to determining to perform additional compressing, re-performing the weight pruning and the tuning. In one or more embodiments, performing the weight pruning further comprises, responsive to determining not to perform additional compressing, performing a transformation. In one or more embodiments, performing the activation bypass avoids performing a multiplication and accumulation (MAC) operation, and wherein the MAC operation is performed for values above the first threshold. In one or more embodiments, the first threshold is determined based at least in part on a percent of operations pruned and a prediction error percentage. In one or more embodiments, the accelerator further comprises a neural processing unit instruction fetcher, a dispatcher, a level 1 cache, and a level 2 cache. In one or more embodiments, the accelerator is communicatively coupled to a host central processing unit via the memory, wherein the accelerator is a special purpose processor and wherein the host central processing unit is a general purpose processor. In one or more embodiments, the host central processing unit receives the image data from the camera associated with the vehicle and stores the image data associated with the plurality of images to the memory.

In another exemplary embodiment, a system includes a memory having computer readable instructions and a processing device for executing the computer readable instructions for performing a method. The method includes capturing a plurality of images at a camera associated with a vehicle and storing image data associated with the plurality of images to a memory. The method further includes dispatching vehicle perception tasks to a plurality of processing elements of an accelerator in communication with the memory. The method further includes performing, by at least one of the plurality of processing elements, the vehicle perception tasks for the vehicle perception using a neural network, wherein performing the vehicle perception tasks comprises performing an activation bypass for values below a first threshold, and performing weight pruning of synapses and neurons of the neural network based at least in part on a second threshold. The method further includes controlling the vehicle based at least in part on a result of performing the vehicle perception tasks.

In one or more embodiments, performing the weight pruning further comprises: performing an analysis; performing weight pruning based on the analysis; and tuning the weight pruning. In one or more embodiments, performing the weight pruning further comprises determining whether to perform additional compression. In one or more embodiments, performing the weight pruning further comprises, responsive to determining to perform additional compressing, re-performing the weight pruning and the tuning. In one or more embodiments, performing the weight pruning further comprises, responsive to determining not to perform additional compressing, performing a transformation. In one or more embodiments, performing the activation bypass avoids performing a multiplication and accumulation (MAC) operation, and wherein the MAC operation is performed for values above the first threshold. In one or more embodiments, the first threshold is determined based at least in part on a percent of operations pruned and a prediction error percentage. In one or more embodiments, the accelerator further comprises a neural processing unit instruction fetcher, a dispatcher, a level 1 cache, and a level 2 cache. In one or more embodiments, the accelerator is communicatively coupled to a host central processing unit via the memory, wherein the accelerator is a special purpose processor and wherein the host central processing unit is a general purpose processor, and the host central processing unit receives the image data from the camera associated with the vehicle and stores the image data associated with the plurality of images to the memory.

In yet another exemplary embodiment a computer program product includes a computer readable storage medium having program instructions embodied therewith, the program instructions executable by a processing device to cause the processing device to perform a method. The method includes capturing a plurality of images at a camera associated with a vehicle and storing image data associated with the plurality of images to a memory. The method further includes dispatching vehicle perception tasks to a plurality of processing elements of an accelerator in communication with the memory. The method further includes performing, by at least one of the plurality of processing elements, the vehicle perception tasks for the vehicle perception using a neural network, wherein performing the vehicle perception tasks comprises performing an activation bypass for values below a first threshold, and performing weight pruning of synapses and neurons of the neural network based at least in part on a second threshold. The method further includes controlling the vehicle based at least in part on a result of performing the vehicle perception tasks.

The above features and advantages, and other features and advantages of the disclosure are readily apparent from the following detailed description when taken in connection with the accompanying drawings.

BRIEF DESCRIPTION OF THE DRAWINGS

Other features, advantages, and details appear, by way of example only, in the following detailed description, the detailed description referring to the drawings in which:

FIG. 5 depicts a graph of a threshold for making the bypass determination at the bypass of FIG. 4 according to one or more embodiments described herein;

FIG. 6A depicts a node graph of nodes and synapses connecting the nodes prior to weight pruning;

FIG. 6B depicts a pruned node graph of nodes and synapses connecting the nodes after weight pruning according to one or more embodiments described herein;

DETAILED DESCRIPTION

The following description is merely exemplary in nature and is not intended to limit the present disclosure, its application or uses. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

The technical solutions described herein provide for vehicle perception using deep neural networks. Vehicle perception provides for object detection and recognition by processing images captured by one or more cameras associated with a vehicle (e.g., a car, a motorcycle, a boat, or any other type of vehicle). Vehicle perception aids a driver/operator of a vehicle by providing information external to the vehicle and/or aids autonomous vehicles by providing information useful for making driving decisions (e.g., whether to accelerate, brake, turn, etc.).

Modern vehicles generally include one or more cameras that provide backup assistance, take images of the vehicle driver to determine driver drowsiness or attentiveness, provide images of the road (as the vehicle is traveling) for collision avoidance purposes, provide structure recognition, such as roadway signs, etc. For example, a vehicle can be equipped with multiple cameras, and images from multiple cameras (referred to as "surround view cameras") can be used to create a "surround" or "bird's eye" view of the vehicle. Some of the cameras (referred to as "long-range cameras") can be used to capture long-range images (e.g., for object detection for collision avoidance, structure recognition, etc.).

These vehicles may also be equipped with an in-vehicle display (e.g., a touchscreen) that is used to display camera images and/or other images to a driver of the vehicle. For example, a traditional rear-view mirror and/or side-view mirror may be replaced with a display that displays a camera image from a camera positioned at the rear of the vehicle to display the "rear view" to the driver in place of the traditional rear-view mirror.

Figure 1:
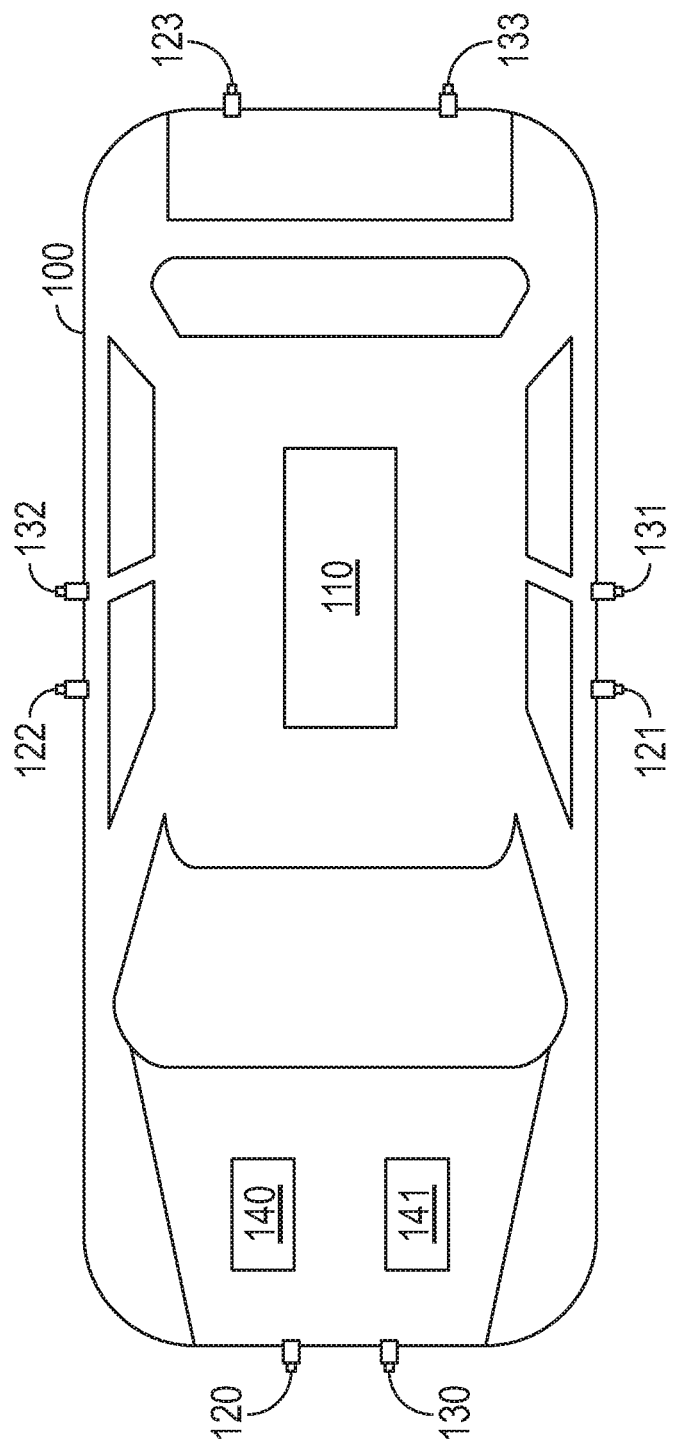
FIG. 1 depicts a vehicle including a processing system for activation zero-bypass and weight pruning in neural networks for vehicle perception according to one or more embodiments described herein.

An example of such a vehicle is depicted in FIG. 1. In particular, FIG. 1 depicts a vehicle 100 including a processing system 110 for activation zero-bypass and weight pruning in neural networks for vehicle perception systems. The vehicle 100 may be a car, truck, van, bus, motorcycle, or another suitable vehicle. The processing system 110 associated with the vehicle 100 is responsible for vehicle perception by analyzing images captured by a plurality of cameras associated with the vehicle 100.

In the example of FIG. 1, the vehicle 100 includes cameras 120, 121, 122, 123, and cameras 130, 131, 132, 133. According to one or more embodiments described herein, the cameras 120-123 are surround view cameras that capture images external to, and in near proximity to, the vehicle 100. The images captured by the cameras 120-123 together form a surround view (sometimes referred to as a "top-down view" or a "bird's eye view") of the vehicle 100. These images can be used for operating the vehicle (e.g., parking, backing, etc.). According to one or more embodiments described herein, the cameras 130-133 are long-range cameras that capture images external to the vehicle and farther away from the vehicle 100 than the cameras 120-123. These images can be processed using vehicle perception techniques using deep neural networks. The results can be used for object detection and avoidance, for example. It should be appreciated that, although eight cameras 120-123 and 130-133 are shown, more or fewer cameras may be implemented in various embodiments.

The captured images can be displayed on a display (not shown) to provide external views of the vehicle 100 to the driver/operator of the vehicle 100. The captured images can be displayed as live images, still images, or some combination thereof. In some examples, the images can be combined to form a composite view, such as the surround view. The displayed images can also be overlaid with information determined during processing/analysis. For example, an image can be overlaid with distance information (e.g., distance from the vehicle 100 to another object/vehicle), safety information (e.g., a warning of a potential collision), and the like.

The vehicle 100 can also include sensors, such as sensors 140, 141. According to one or more embodiments, the sensor 140 represents a high-resolution radar, and the sensor 141 represents a light imaging detection and ranging (Lidar) sensor. Other numbers and types of sensors can be used.

The processing system 110 uses images captured from one or more of the cameras 120-123, 130-133 to perform vehicle perception using deep neural networks. For example, the vehicle perception can include performing feature extraction, object detection and avoidance, and the like.

The various components, modules, engines, etc. described regarding FIG. 1 can be implemented as instructions stored on a computer-readable storage medium, as hardware modules, as special-purpose hardware (e.g., application specific hardware, application specific integrated circuits (ASICs), application specific special processors (ASSPs), field programmable gate arrays (FPGAs), as embedded controllers, hardwired circuitry, etc.), or as some combination or combinations of these. According to aspects of the present disclosure, the engine(s) described herein can be a combination of hardware and programming. The programming can be processor executable instructions stored on a tangible memory, and the hardware can include a processing device (e.g., the CPU 1021 of FIG. 10) for executing those instructions. Thus a system memory (e.g., the RAM 1024 of FIG. 10) can store program instructions that when executed by the processing device implement the engines described herein. Other engines can also be utilized to include other features and functionality described in other examples herein.

Figure 2:
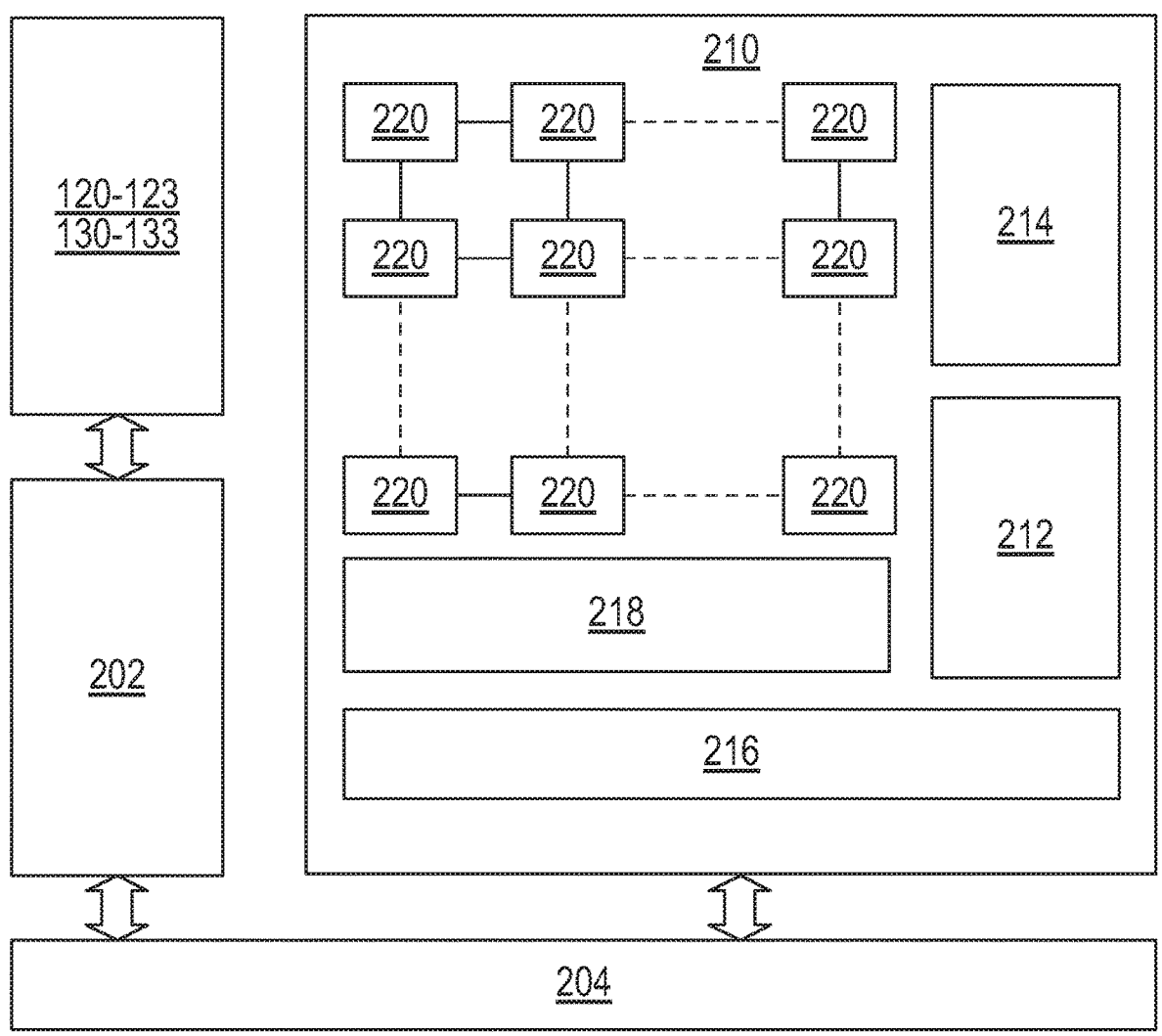
FIG. 2 depicts the processing system of FIG. 1 for activation zero-bypass and weight pruning in neural networks according to one or more embodiments described herein.

FIG. 2 depicts the processing system 110 of FIG. 1 activation zero-bypass and weight pruning in neural networks according to one or more embodiments described herein. The processing system 110 receives images from one or more of the cameras 120-123,130-133 at a processing device 202. The processing device 202 (also referred to as a host central processing unit) can perform object-level tracking, execute applications, and perform other general purpose tasks. In this way, the processing device 202 is a general purpose hardware device. The processing device 202 is configured to receive the images from the cameras 120-123, 130-133 and store the images as image data to a memory 204 (also referred to as a shared memory), which can be a dynamic random-access memory or another suitable memory.

A special purpose hardware device, referred to as a "neural processing unit" or "accelerator" 210, is configured to receive the image data stored in the memory 204 and perform image processing on the image data. The image processing can include point cloud processing, NN tasks, and the like. The accelerator 210 can be an ASIC, a field programmable gate array (FPGA), graphics processing unit (GPU), or another suitable special purpose hardware device.

According to one or more embodiments described herein, the accelerator 210 can utilize machine learning functionality to accomplish the various image processing/analysis described herein. More specifically, the accelerator 210 can incorporate and utilize rule-based decision making and artificial intelligence (AI) reasoning to accomplish the various operations of the accelerator 210 described herein. The phrase "machine learning" broadly describes a function of electronic systems that learn from data. A machine learning system, engine, or module can include a trainable machine learning algorithm that can be trained, such as in an external cloud environment, to learn functional relationships between inputs and outputs that are currently unknown, and the resulting model can be used to perform feature extraction, object detection, collision avoidance, and the like. In one or more embodiments, machine learning functionality can be implemented using an artificial neural network (ANN) having the capability to be trained to perform a currently unknown function. In machine learning and cognitive science, ANNs are a family of statistical learning models inspired by the biological neural networks of animals, and in particular the brain. ANNs can be used to estimate or approximate systems and functions that depend on a large number of inputs.

ANNs can be embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in ANNs that carry electronic messages between simulated neurons are provided with numeric weights that correspond to the strength or weakness of a given connection. The weights can be adjusted and tuned based on experience, making ANNs adaptive to inputs and capable of learning. For example, an ANN for object detection and recognition is defined by a set of input neurons that can be activated by the pixels of an input image. After being weighted and transformed by a function determined by the network's designer, the activation of these input neurons are then passed to other downstream neurons, which are often referred to as "hidden" neurons or "hidden" layers. This process is repeated until an output neuron is activated. The activated output neuron determines what object was detected.

The accelerator 210 includes a neural processing unit (NPU) instruction fetcher 212 to fetch/receive instructions and image data from the memory 204. The instructions can include instructions to perform, for example, feature extraction, object detection, and the like. The accelerator 210 also includes a dispatcher 214 to dispatch/schedule the instructions to a plurality of processing elements 220.

The accelerator 210 also includes additional memories, such as cache 216, which can be a level 2 (L2) cache, and a global memory buffer 218, which can be a level 1 (L1) cache. The global memory buffer 218 can be a static random-access memory for example.

The processing elements 220 perform the deep neural network-based techniques for vehicle perception. In particular, the dispatcher 214 dispatches instructions and image data to the individual processing elements 220, which together process/analyze the image data to perform vehicle perception.

Typically, the processing elements 220 perform an activation function as part of deep neural network-based techniques for vehicle perception. An activation function defines the output of a node of a neural network given an input or set of inputs. Zero or near-zero input values consume computational resources of the processing elements 220 when the processing elements 220 perform activation functions. The present techniques reduce computational demand on the processing elements 220 by utilizing a bypass path for zero and/or near-zero input values. The bypass path essentially skips the zero and/or near-zero input values during activation. The bypass path saves a multiplication and accumulation (MAC) operation and a memory read operation. This can result, for example, in an approximate 40% reduction in processing resources consumed by the processing elements 220.

Figure 3:
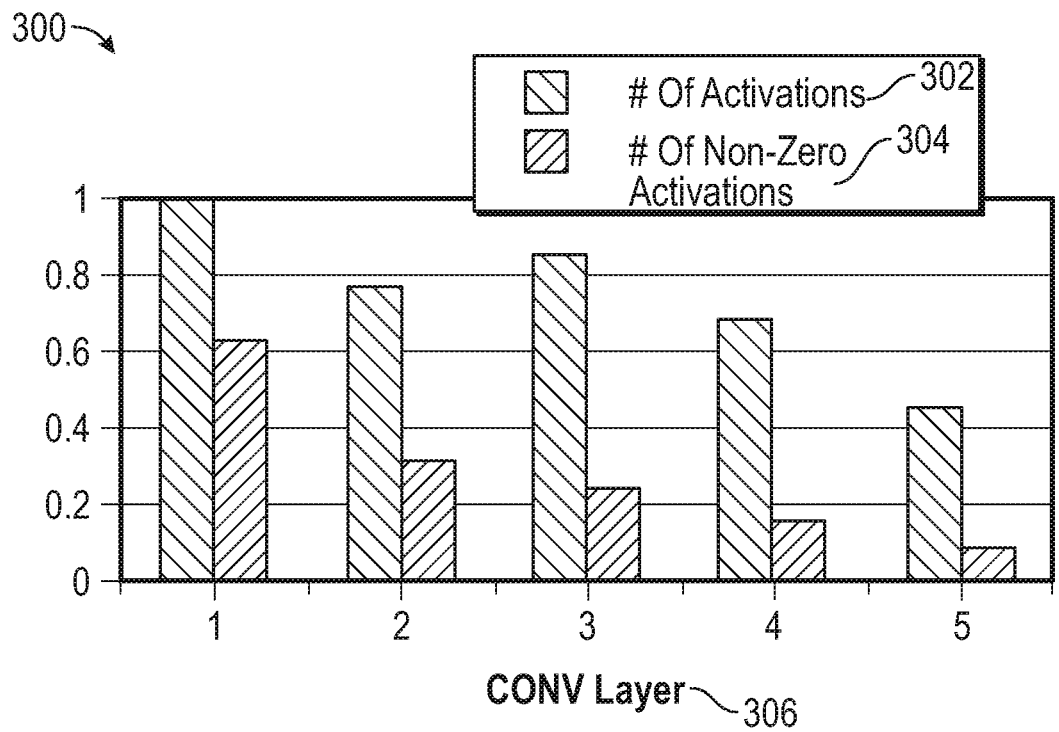
FIG. 3 depicts a graph of a number of activations and a number of non-zero activations for convolutional layers of a neural network according to one or more embodiments described herein.

FIG. 3 depicts a graph 300 of a number of activations 302 and a number of non-zero activations 304 for convolutional layers 306 of a neural network according to one or more embodiments described herein. As shown in the graph 300, the number of non-zero activations is significantly less than the number of activations at each convolutional layer. This reduction is achieved due to the bypass path depicted in FIG. 4 and represents a significant reduction in processing resources consumed by the processing elements 220.

Figure 4:
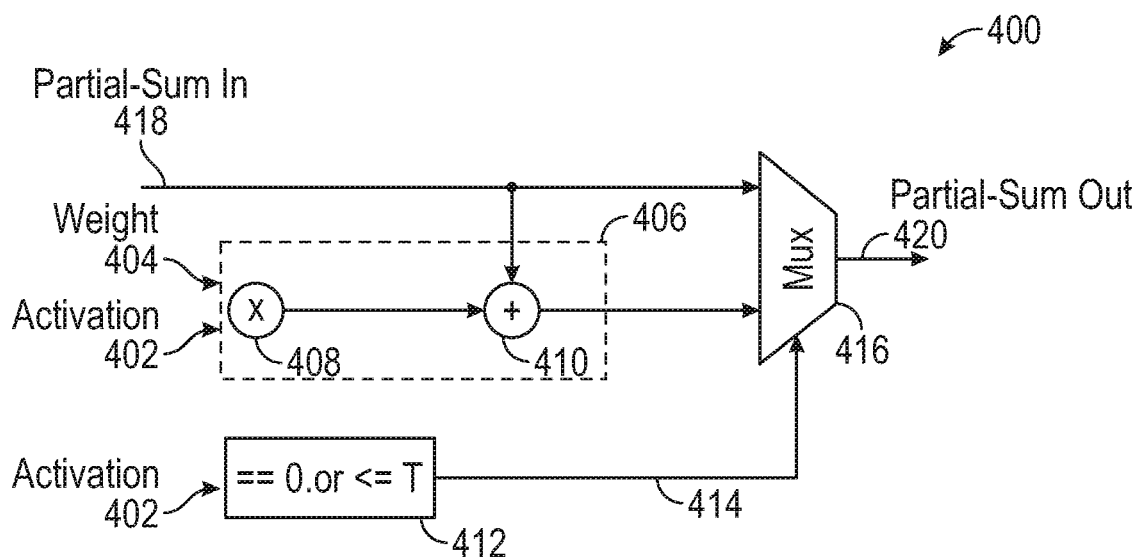
FIG. 4 depicts a block diagram of a bypass path used during activation of convolution layers of a neural network according to one or more embodiments described herein.

FIG. 4 depicts a block diagram 400 of a bypass path used during activation of convolution layers of a neural network according to one or more embodiments described herein. Traditionally, an activation input 402 and a synapse weight 404 are input into a MAC operation 406 having a multiply component 408 and an addition component 410. As described herein, performing activation on zero or near-zero activation inputs 402 is computationally intensive and can have little (if any) effect on accuracy. Accordingly, the technical solutions shown in the block diagram 400 reduce computation demand on the processing elements 220 (and accordingly the accelerator 210) by performing a bypass 412 on zero or near-zero values. As shown in the block diagram 400, when an activation input 402 is zero or near-zero, as determined at bypass 412, the activation input 402 is fed as input 414 directly into the multiplexer (MUX) 416 while "bypassing" the MAC operation 406, thus saving the processing elements 220 from performing the MAC operation 406. The MUX 416 selects between a partial-sum input 418 and one of the output of the MAC operation 406 (for non-bypass activation inputs 402) or the input 414, which represent the bypass to the MAC operation 406 for zero or near-zero activation inputs 402. A partial-sum 420 is output from the MUX 416.

An activation input 402 is considered "near-zero" when it is below a threshold. FIG. 5 depicts a graph 500 of a threshold 502 for making the bypass determination at the bypass 412 according to one or more embodiments described herein. The threshold 502 for bypass values 504 can be determined based on a percent of operations pruned 506 and a prediction error as a percent 508. The threshold 502 enables a tradeoff between accuracy and processing speed. As processing speed increases, so too does an amount of processing resources consumed by the processing elements 220. According to the examples described herein, small decreases in accuracy can yield significant improvements to the amount of processing resource consumed by the processing elements 220, which represents an improvement to the functionality of the processing system 110.

The present techniques also improve the processing system 110 by performing weight pruning of neurons (also referred to as "nodes") and synapses between the nodes used for activation functions.

FIG. 6A depicts a node graph 600 of nodes 602 and synapses 604 connecting the nodes 602 prior to weight pruning. In general, weight pruning reduces the number of nodes 602 and synapses 604 connecting the nodes 602. The results of weight pruning are depicted in FIG. 6B. In particular, FIG. 6B depicts a pruned node graph 601 of nodes 603 and synapses 605 connecting the nodes 603 after weight pruning according to one or more embodiments described herein.

Pruning the node graph 600 reduces weight and MAC operations during activation so that the weight and activation can be stored in the global memory buffer 218 instead of the memory 204. In some examples, weight is reduced by approximately 10% while increasing processing efficiency of the processing elements by approximately 10% because the weight and activation can be stored in the global memory buffer 218 instead of the memory 204. According to one or more embodiments described herein, weight can be reduced by a factor of nine while MAC operations are reduced by a factor of three, representing significant improvements to the functioning of the processing system 110.

Figure 7:
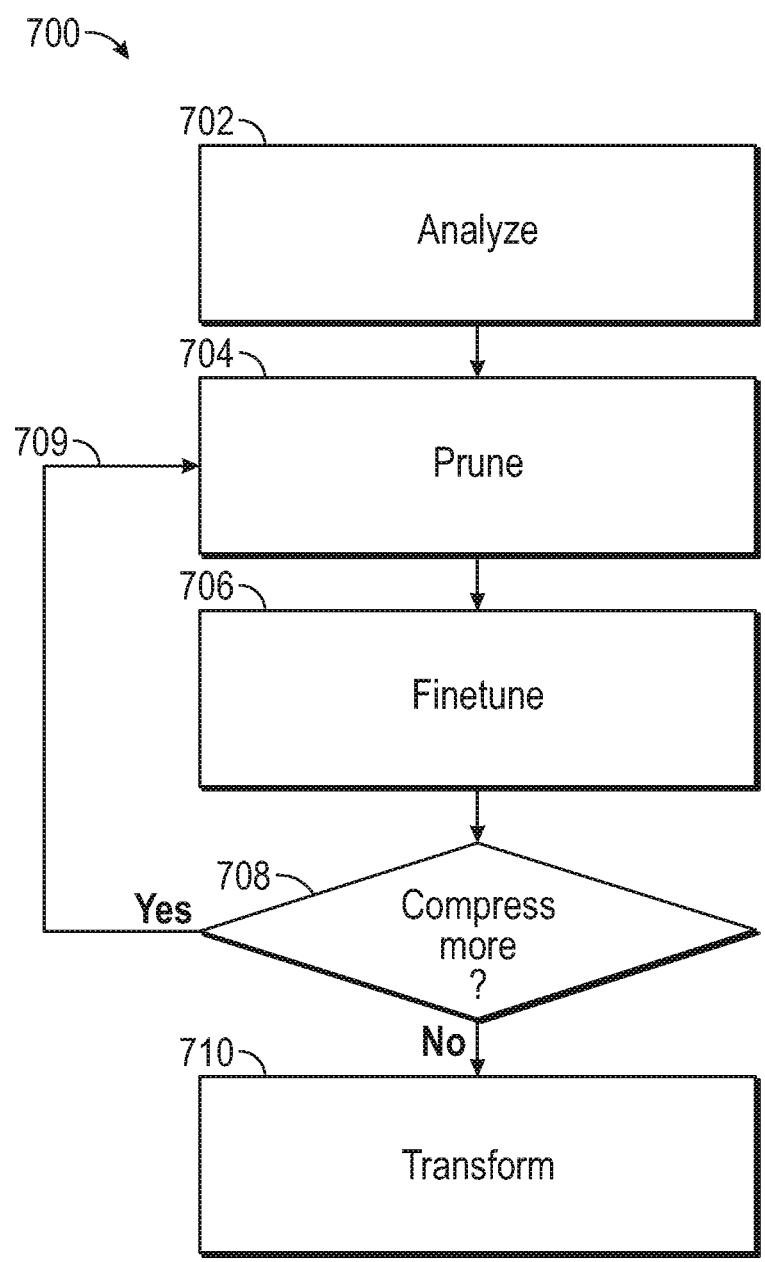
FIG. 7 depicts a flow diagram of a method for performing weight pruning during activation of convolution layers of a neural network according to one or more embodiments described herein.

Weight pruning is performed using the method 700 of FIG. 7. In particular, FIG. 7 depicts a flow diagram of a method for performing weight pruning during activation of convolution layers of a neural network according to one or more embodiments described herein. The method 700 can be performed by any suitable processing system and/or processing device, such as the processing system 110 of FIGS. 1 and 2, the accelerator 210 of FIG. 2, the processing system 1000 of FIG. 10, or another suitable processing device and/or processing system.

At block 702, the accelerator 210 performs an analysis. The analysis block 702 receives a model from a prior layer of the neural network in the form of a topological graph and learned weight parameters (i.e., convolutional and fully connected layers). The accelerator 210 consolidates a batch normalization layer with the preceding convolutional and/or fully connected layers.

At block 704, the accelerator 210 performs weight pruning. In particular, the accelerator 210 prunes low-weight synapses (connections between nodes), which may be synapses with weights below a threshold. Synapses with weights less than the threshold are removed from the neural network. Pruning the synapses with weights below the threshold can result in dead neurons, which are neurons without any input synapses or output synapses. These dead neurons are also removed from the neural network. Once pruning of synapses and dead neurons is performed, a pruned node graph (e.g., the pruned node graph 601) remains.

At block 706, the accelerator 210 performs fine tuning of the weight pruning of block 704. The accelerator 210 retrains the pruned node graph with a dataset D, a pruned weight W', a cost function C, and a regularization term $|W'|_{L1}$ as follows:

$$W^* = \mathrm{argmin}_{W'} C(W', D) + |W'|_{L1}.$$

The regularization penalizes large weights and benefits the quantization and pruning processes used in the neural network.

At decision block 708, the accelerator 210 determines whether to perform additional compression. This determination is based on a size of the global memory buffer 218 and the size of the pruned node graph 601. If it is determined to perform additional compression at decision block 708, the compression continues iteratively (depicted by arrow 709) until the pruned node graph 601 can be stored in the global memory buffer 218. If it is determined not to perform additional compression at decision block 708, the method proceeds to block 710.

At block 710, the accelerator 210 performs a transformation using a lossless compression technique. In particular, the lossless compression technique is applied to iteratively prune weights W* so that the weights can be stored in the global buffer SRAM (e.g., the global memory buffer 218) instead of the memory 204.

Figure 8A:
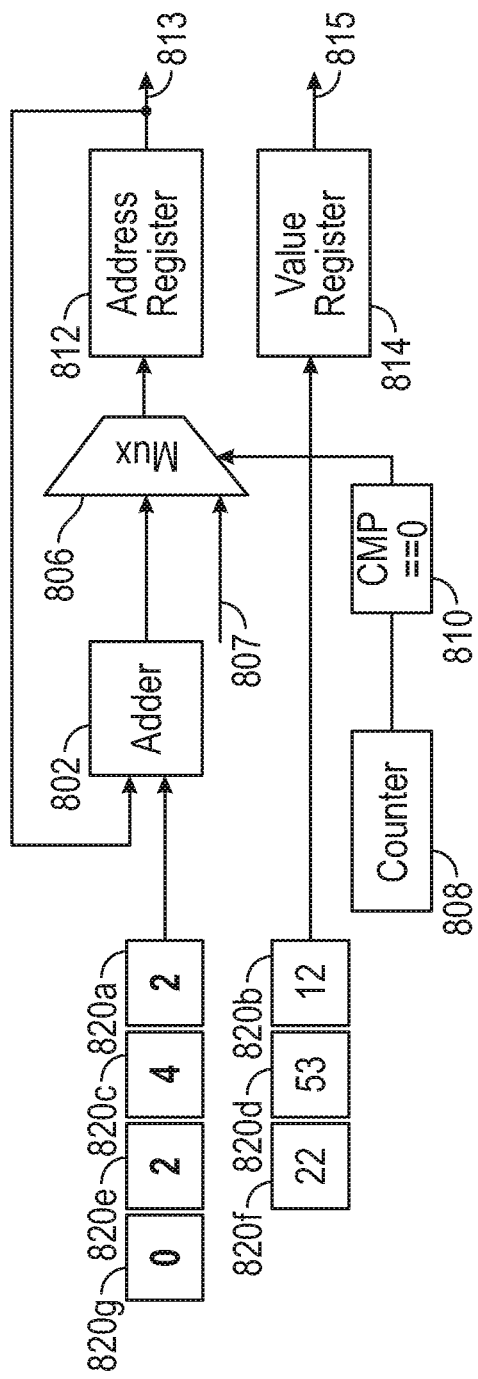
FIGS. 8A and 8B depict a block diagram for implementing a lossless compression according to one or more embodiments described herein.

FIG. 8A depicts a block diagram for implementing the lossless compression technique used at block 710 of FIG. 7 according to one or more embodiments described herein. The accelerator 210 and the processing elements 220 are improved when the pruned node graph 601 and associated pruned weights W* are stored in the global memory buffer 218 instead of the memory 204. The improvement occurs because write/read times are reduced since the pruned node graph 601 and associated pruned weights W* are stored locally in the global memory buffer 218 with respect to the accelerator 210 and the processing elements 220.

Figure 8B:
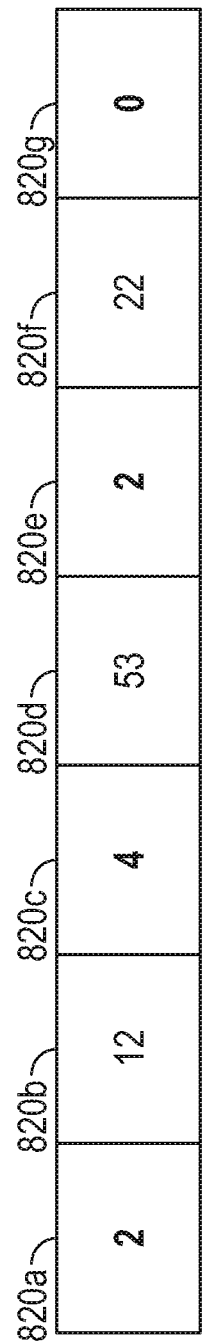

According to one or more embodiments described herein, the lossless compression can be performed using run-length compression (RLC). In RLC, a run of data is stored as a single data value and count rather than as the original run of data. As an example, a list of synapse weights $\{W_{ik}\}$ for a neuron $y_i$ as follows: 0, 0, 12, 0, 0, 0, 0, 53, 0, 0, 22. In this examples, consecutive zero (0) values are runs of data and can be compressed as a single data value and count. The RLC results of this example are depicted in FIG. 8B, where the bold values (blocks 820a, 820c, 820e) are the count of the zero values, and the non-bold values (block 820b, 820d, 820f are the data values for non-zero values. The block 820g represents the ending block. The blocks containing the zero values (e.g., blocks 820a, 820c, 820e) are 4-bit blocks, while the blocks containing non-zero values (e.g., block 820b, 820d, 820f are 8-bit blocks.

The blocks from FIG. 8B are used as inputs into the block diagram for implementing the lossless compression technique of FIG. 8A. In particular, the non-zero values ((e.g., blocks 820a, 820c, 820e) are offset inputs into an adder 802. The adder 802 also receives, as input, an output 813 from the address register 812. The adder adds the non-zero value input and the output 813 and sends the results to a multiplexer 806, which selects between the output of the adder and a base address 807 based on results of a comparison 810 of a counter 808. The output of the multiplexer 806 is input into the address register 812, which outputs 813 an output address. A value register 814 outputs an output value 815 for non-zero inputs 820d, 820d, 820f. The lossless compression is complete when the ending block 820g is reached.

Figure 9:
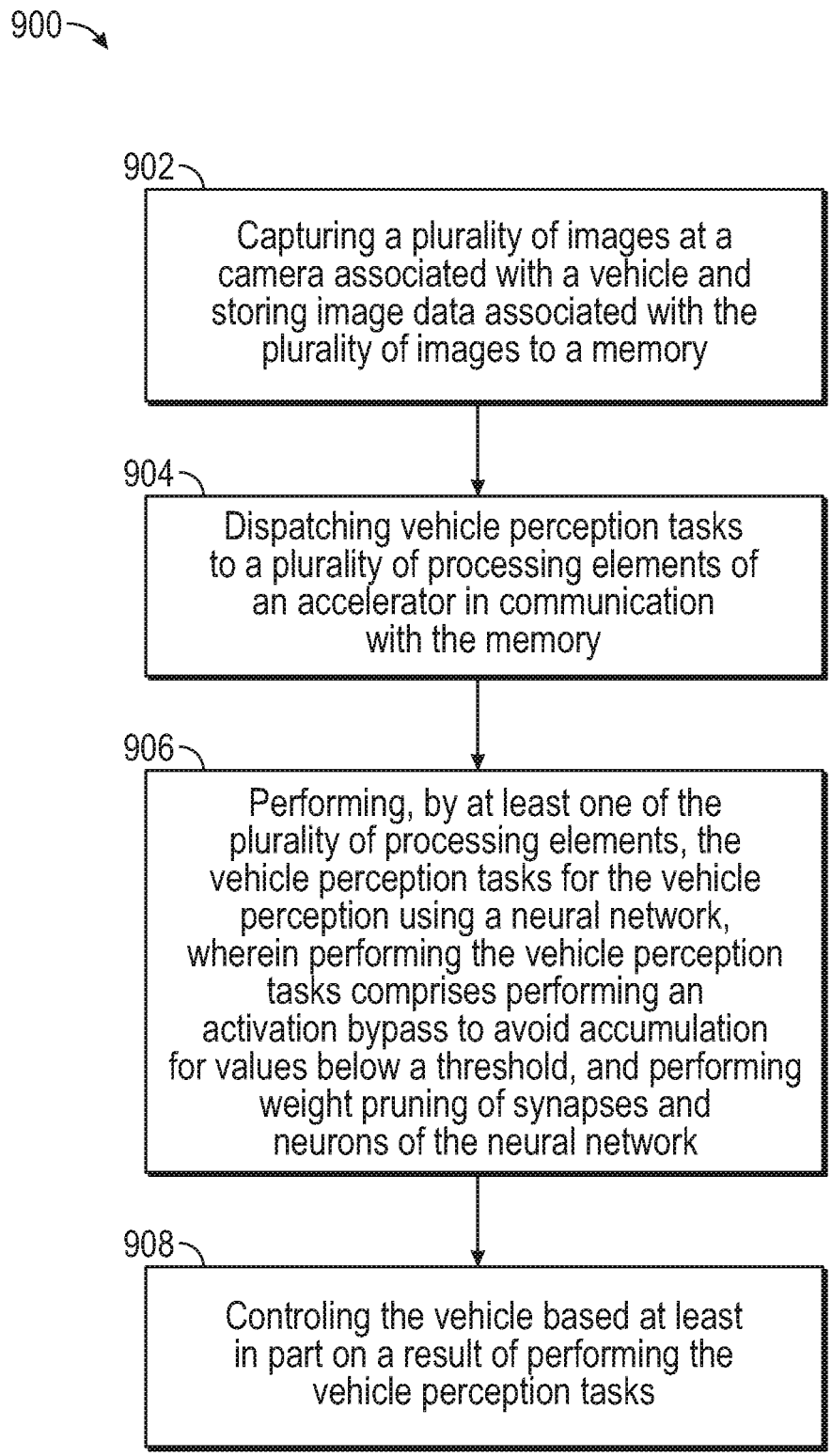
FIG. 9 depicts a flow diagram of a method for activation zero-bypass and weight pruning in neural networks for vehicle perception systems according to one or more embodiments described herein.

FIG. 9 depicts a flow diagram of a method 900 for activation zero-bypass and weight pruning in neural networks for vehicle perception systems according to one or more embodiments described herein. The method 900 can be performed by any suitable processing system and/or processing device, such as the processing system 110 of FIGS. 1 and 2, the accelerator 210 of FIG. 2, the processing system 1000 of FIG. 10, or another suitable processing device and/or processing system.

At block 902, a camera (e.g., one of the cameras 120-123, 130-133) associated with the vehicle 100 captures a plurality of images. The processing device 202 stores image data associated with the plurality of images to the memory 204.

At block 904, the NPU instruction fetcher 212 fetches vehicle perception tasks indicative of how to process the plurality of images, and the dispatcher 214 dispatches vehicle perception tasks to the processing elements 220 of the accelerator 210 in communication with the memory 204.

At block 906, at least one of the plurality of processing elements 220 performs the vehicle perception tasks for the vehicle perception using a neural network. In particular, the processing elements 220 performing the vehicle perception tasks by performing an activation bypass for values below a first threshold, and by performing weight pruning of synapses and neurons of the neural network based at least in part on a second threshold.

At block 908, results of performing the vehicle perception tasks are used to control the vehicle 100. For example, an autonomous vehicle can be controlled to avoid an object detected as a result of the vehicle perception task. In another example, a driver of the vehicle 100 can be alerted to an object detected as a result of the vehicle perception task.

Additional processes also may be included, and it should be understood that the process depicted in FIG. 9 represents an illustration, and that other processes may be added or existing processes may be removed, modified, or rearranged without departing from the scope and spirit of the present disclosure.

Figure 10:
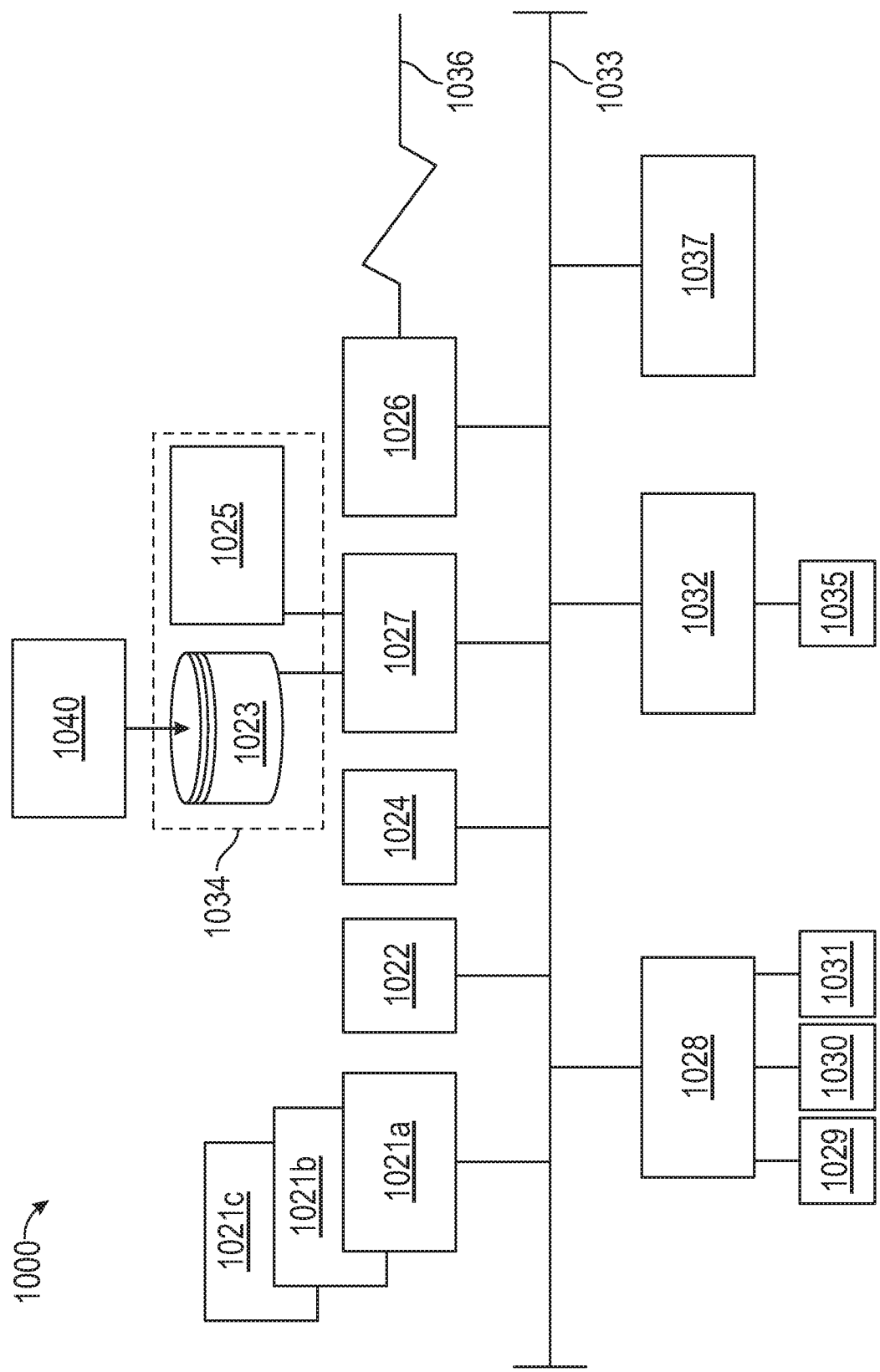
FIG. 10 depicts a block diagram of a processing system for implementing the techniques described herein according to aspects of the present disclosure.

It is understood that the present disclosure is capable of being implemented in conjunction with any other type of computing environment now known or later developed. For example, FIG. 10 depicts a block diagram of a processing system 1000 for implementing the techniques described herein. In examples, processing system 1000 has one or more central processing units (processors) 1021a, 1021b, 1021c, etc. (collectively or generically referred to as processor(s) 1021 and/or as processing device(s)). In aspects of the present disclosure, each processor 1021 can include a reduced instruction set computer (RISC) microprocessor. Processors 1021 are coupled to system memory (e.g., random access memory (RAM) 1024) and various other components via a system bus 1033. Read only memory (ROM) 1022 is coupled to system bus 1033 and may include a basic input/output system (BIOS), which controls certain basic functions of processing system 1000.

Further depicted are an input/output (I/O) adapter 1027 and a network adapter 1026 coupled to system bus 1033. I/O adapter 1027 may be a small computer system interface (SCSI) adapter that communicates with a hard disk 1023 and/or a storage drive 1025 or any other similar component. I/O adapter 1027, hard disk 1023, and storage device 1025 are collectively referred to herein as mass storage 1034. Operating system 1040 for execution on processing system 1000 may be stored in mass storage 1034. The network adapter 1026 interconnects system bus 1033 with an outside network 1036 enabling processing system 1000 to communicate with other such systems.

A display (e.g., a display monitor) 1035 is connected to system bus 1033 by display adapter 1032, which may include a graphics adapter to improve the performance of graphics intensive applications and a video controller. In one aspect of the present disclosure, adapters 1026, 1027, and/or 1032 may be connected to one or more I/O busses that are connected to system bus 1033 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 1033 via user interface adapter 1028 and display adapter 1032. A keyboard 1029, mouse 1030, and speaker 1031 may be interconnected to system bus 1033 via user interface adapter 1028, which may include, for example, a Super I/O chip integrating multiple device adapters into a single integrated circuit.

In some aspects of the present disclosure, processing system 1000 includes a graphics processing unit 1037. Graphics processing unit 1037 is a specialized electronic circuit designed to manipulate and alter memory to accelerate the creation of images in a frame buffer intended for output to a display. In general, graphics processing unit 1037 is very efficient at manipulating computer graphics and image processing, and has a highly parallel structure that makes it more effective than general-purpose CPUs for algorithms where processing of large blocks of data is done in parallel.

Thus, as configured herein, processing system 1000 includes processing capability in the form of processors 1021, storage capability including system memory (e.g., RAM 1024), and mass storage 1034, input means such as keyboard 1029 and mouse 1030, and output capability including speaker 1031 and display 1035. In some aspects of the present disclosure, a portion of system memory (e.g., RAM 1024) and mass storage 1034 collectively store an operating system to coordinate the functions of the various components shown in processing system 1000.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A computer-implemented method for vehicle perception, the method comprising:
   capturing a plurality of images at a camera associated with a vehicle and storing image data associated with the plurality of images to a memory;
   dispatching vehicle perception tasks to a plurality of processing elements of an accelerator in communication with the memory;
   performing, by at least one of the plurality of processing elements, the vehicle perception tasks for the vehicle perception using a neural network, wherein performing the vehicle perception tasks comprises:
      performing an activation bypass for values below a first threshold, and
      performing weight pruning of synapses and neurons of the neural network based at least in part on a second threshold, wherein performing the weight pruning further comprises performing an analysis, wherein the analysis receives a model from a prior layer of the neural network in the form of a topological graph and learned weight parameters, wherein the analysis further comprises consolidating a batch normalization layer with a preceding convolutional or fully connected layer; and
   controlling the vehicle based at least in part on a result of performing the vehicle perception tasks.

2. The computer-implemented method of claim 1, wherein performing the weight pruning further comprises:
   performing weight pruning based on the analysis; and
   tuning the weight pruning.

3. The computer-implemented method of claim 2, wherein performing the weight pruning further comprises determining whether to perform additional compression.

4. The computer-implemented method of claim 3, wherein performing the weight pruning further comprises, responsive to determining to perform additional compressing, re-performing the weight pruning and the tuning.

5. The computer-implemented method of claim 3, wherein performing the weight pruning further comprises, responsive to determining not to perform additional compressing, performing a transformation.

6. The computer-implemented method of claim 1, wherein performing the activation bypass avoids performing a multiplication and accumulation (MAC) operation, and wherein the MAC operation is performed for values above the first threshold.

7. The computer-implemented method of claim 1, wherein the first threshold is determined based at least in part on a percent of operations pruned and a prediction error percentage.

8. The computer-implemented method of claim 1, wherein the accelerator further comprises a neural processing unit instruction fetcher, a dispatcher, a level 1 cache, and a level 2 cache.

9. The computer-implemented method of claim 1, wherein the accelerator is communicatively coupled to a host central processing unit via the memory, wherein the accelerator is a special purpose processor and wherein the host central processing unit is a general purpose processor.

10. The computer-implemented method of claim 9, wherein the host central processing unit receives the image data from the camera associated with the vehicle and stores the image data associated with the plurality of images to the memory.

11. A system comprising:
    a memory comprising computer readable instructions; and
    a processing device for executing the computer readable instructions for performing a method for vehicle perception, the method comprising:
       capturing a plurality of images at a camera associated with a vehicle and storing image data associated with the plurality of images to a memory;
       dispatching vehicle perception tasks to a plurality of processing elements of an accelerator in communication with the memory;
       performing, by at least one of the plurality of processing elements, the vehicle perception tasks for the vehicle perception using a neural network, wherein performing the vehicle perception tasks comprises:
          performing an activation bypass for values below a first threshold, and
          performing weight pruning of synapses and neurons of the neural network based at least in part on a second threshold, wherein performing the weight pruning comprises tuning the weight pruning by retraining a pruned node graph with a dataset D, a pruned weight W', a cost function C, and a regularization term $|W'|_{L1}$ as follows:

$$W^* = \mathrm{argmin}_{w'}\, C(W', D) + |W'|_{L1};\text{ and}$$

controlling the vehicle based at least in part on a result of performing the vehicle perception tasks.

12. The system of claim 11, wherein performing the weight pruning further comprises:
    performing an analysis; and
    performing weight pruning based on the analysis.

13. The system of claim 12, wherein performing the weight pruning further comprises determining whether to perform additional compression.

14. The system of claim 13, wherein performing the weight pruning further comprises, responsive to determining to perform additional compressing, re-performing the weight pruning and the tuning.

15. The system of claim 13, wherein performing the weight pruning further comprises, responsive to determining not to perform additional compressing, performing a transformation.

16. The system of claim 11, wherein performing the activation bypass avoids performing a multiplication and accumulation (MAC) operation, and wherein the MAC operation is performed for values above the first threshold.

17. The system of claim 11, wherein the first threshold is determined based at least in part on a percent of operations pruned and a prediction error percentage.

18. The system of claim 11, wherein the accelerator further comprises a neural processing unit instruction fetcher, a dispatcher, a level 1 cache, and a level 2 cache.

19. The system of claim 11, wherein the accelerator is communicatively coupled to a host central processing unit via the memory, wherein the accelerator is a special purpose processor and wherein the host central processing unit is a general purpose processor, and wherein the host central processing unit receives the image data from the camera associated with the vehicle and stores the image data associated with the plurality of images to the memory.

20. A computer program product comprising:
  a computer readable storage medium having program instructions embodied therewith, the program instructions executable by a processing device to cause the processing device to perform a method for vehicle perception, the method comprising:
  capturing a plurality of images at a camera associated with a vehicle and storing image data associated with the plurality of images to a memory;
  dispatching vehicle perception tasks to a plurality of processing elements of an accelerator in communication with the memory;
  performing, by at least one of the plurality of processing elements, the vehicle perception tasks for the vehicle perception using a neural network, wherein performing the vehicle perception tasks comprises:
    performing an activation bypass for values below a first threshold, wherein performing the activation bypass comprises bypassing a multiply add operation by inputting an activation input directly into a multiplexer, the multiplexer outputting a partial-sum value, and
    performing weight pruning of synapses and neurons of the neural network based at least in part on a second threshold; and
  controlling the vehicle based at least in part on a result of performing the vehicle perception tasks.

* * * * *